United States Patent
Shivanand et al.

(10) Patent No.: US 11,397,644 B2
(45) Date of Patent: Jul. 26, 2022

(54) METHOD FOR CONTROLLING OPERATIONS OF RAID SYSTEM COMPRISING HOST DEVICE AND PLURALITY OF SSDS

(71) Applicant: Samsung Electronics Co., Ltd., Suwon-si (KR)

(72) Inventors: Srikanth Tumkur Shivanand, Karnataka (IN); Sharath Kumar Kodase, Konanakunte (IN); Vikram Singh, Rajasthan (IN)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 415 days.

(21) Appl. No.: 16/524,876

(22) Filed: Jul. 29, 2019

(65) Prior Publication Data
US 2020/0341844 A1    Oct. 29, 2020

(30) Foreign Application Priority Data

Apr. 23, 2019    (IN) .............................. 201941016055

(51) Int. Cl.
*G06F 11/07* (2006.01)
*G06F 11/10* (2006.01)
(Continued)

(52) U.S. Cl.
CPC .......... *G06F 11/1084* (2013.01); *G06F 3/065* (2013.01); *G06F 3/0619* (2013.01); *G06F 3/0689* (2013.01); *G06F 11/1076* (2013.01); *G06F 11/1448* (2013.01); *G06F 11/1469* (2013.01); *G06F 2201/84* (2013.01)

(58) Field of Classification Search
CPC .............. G06F 11/1084; G06F 3/0619; G06F 11/1076; G06F 11/1448; G06F 11/1469; G06F 2201/84
See application file for complete search history.

(56) References Cited

U.S. PATENT DOCUMENTS 9,262,267 B2    2/2016  Grimsrud et al.
9,384,093 B1    7/2016  Aiello
(Continued)

OTHER PUBLICATIONS

"NVM Express over Fabrics", Revision 1.0, Jun. 5, 2016, Copyright 2007—2016 NVM Express, Inc., pp. 1-49.

*Primary Examiner* — Matthew M Kim
*Assistant Examiner* — Kyle Emanuele
(74) *Attorney, Agent, or Firm* — Harness, Dickey & Pierce, PLC (57) ABSTRACT

Embodiments herein provide a method for controlling operations of a Redundant Array of Independent Disks (RAID) data storage system comprising a host device and a plurality of solid-state drives (SSDs). The method includes performing, by the at least one SSD, recovery of lost data by performing the auto-rebuild operation. The method also includes performing by the at least one SSD, the auto-error correction operation based on the IO error. The method also includes creating a snapshot of an address mapping table by all SSDs of the plurality of SSDs in the RAID data storage system. The auto-rebuild operation, the auto-error correction operation and the creation the snapshot of the address mapping table are all performed without the intervention from the host device.

13 Claims, 7 Drawing Sheets

(51) Int. Cl.
  *G06F 11/14* (2006.01)
  *G06F 3/06* (2006.01)

(56) References Cited

U.S. PATENT DOCUMENTS

| | | |
|---|---|---|
| 2013/0198312 A1 | 8/2013 | Tamir et al. |
| 2014/0215262 A1 | 7/2014 | Li et al. |
| 2015/0006663 A1 | 1/2015 | Huang |
| 2020/0081647 A1* | 3/2020 | Kim ..................... G06F 3/0679 |
| 2022/0058086 A1* | 2/2022 | Park .................... G06F 11/1489 |

* cited by examiner

METHOD FOR CONTROLLING OPERATIONS OF RAID SYSTEM COMPRISING HOST DEVICE AND PLURALITY OF SSDS

CROSS-REFERENCE TO RELATED APPLICATION

This application claims benefit of priority to India Patent Application 201941016055 filed on Apr. 23, 2019 in the India Intellectual Property Office, the disclosure of which is incorporated herein by reference in its entirety.

FIELD

Example embodiments herein relate to computer networks. For example, at least some example embodiments relate to a method for controlling operations of RAID system that includes a host device and plurality of SSDs, a host device and/or an SSD.

BACKGROUND

In general, distributed storage systems may be utilized in a large number of systems which are interconnected by one or more networks. A failure of a part of the distributed storage systems or the entire distributed storage systems may impact the operation of the large number of systems, which are coupled to the distributed storage systems. Therefore, it may be desirable for the distributed storage systems to have high processing speed and high performance while maintaining a high degree of dependability.

The distributed storage systems usually include various mechanisms such as error detection and error correction to protect against data loss. Further, the distributed storage systems also include decentralized algorithms to distribute data among a plurality of storage devices (e.g., SSDs). The plurality of storage devices may each include error detection and correction algorithms such as RAID type algorithms (e.g., RAID5 and RAID6) or Reed-Solomon codes.

The above information is presented as background information only to help the reader. Applicants have made no determination and make no assertion as to whether any of the above might be applicable as prior art with regard to the present application.

SUMMARY

At least some example embodiments provide method for controlling operations of RAID system that includes a host device and plurality of SSDs.

At least some example embodiments offload functions of the host device by shifting specific functions of the host device to the plurality of SSDs.

At least some example embodiments detect by the host device an IO error corresponding to a failure of at least one SSD of the plurality of SSDs and initiating an auto-rebuild operation in at least one SSD of the plurality of SSDs.

At least some example embodiments detect by the host device the IO error which does not correspond to a failure of the at least one SSD of the plurality of SSDs and initiating an auto-error correction operation in at least one SSD of the plurality of SSDs.

At least some example embodiments perform, by the at least one SSD, recovery of lost data by performing the auto-rebuild operation without intervention from the host device.

At least some example embodiments enable a snapshot feature for at least one SSD from the plurality of SSDs to manage a snapshot of an address mapping table by the host device.

At least some example embodiments create a snapshot of an address mapping table by all SSDs of the plurality of SSDs in the RAID data storage system.

At least some example embodiments perform, by the at least one SSD, the auto-error correction operation based on the IO error.

Accordingly at least some example embodiments herein provide methods of controlling operations of a Redundant Array of Independent Disks (RAID) data storage system, the RAID data storage system including a host device and a plurality of solid-state drives (SSDs).

In some example embodiments, the method includes detecting, by the host device, an IO error; determining, by the host device, whether the IO error corresponds to a failure of at least one SSD of the plurality of SSDs; configuring, by the host device, an address mapping table such that the address mapping table includes stripe data at a spare SSD; transmitting, by the host device, an auto-rebuild command to the plurality of SSDs in response to the IO error corresponding to the failure of the at least one SSD, the auto-rebuild command instructing the plurality of SSDs to perform an auto-rebuild operation such that the auto-rebuild command includes information about the spare SSD; and receiving, by the host device, an IO-error correction complete command from each of the plurality of SSDs.

In some other example embodiments, the method includes receiving, by at least one SSD from the plurality of SSDs, an auto-error correction request from the host device, the auto-error correction request requesting performance of an auto-error correction operation, the auto-error correction request including information about an IO error; recovering, by the at least one SSD, data from other SSDs in the plurality of SSDs by performing the auto-error correction operation based on the IO error; and sending, by the at least one SSD, an auto-error correction complete command to the host device after performing the auto-error correction operation.

In some other example embodiments, the method includes receiving, by at least one SSD of the plurality of SSDs, an auto-rebuild command from the host device in response to an IO error corresponding to a failure of the at least one SSD, the auto-rebuild command requesting performance of an auto-rebuild operation, the auto-rebuild command including information about a spare SSD of the plurality of SSDs; reading, by the at least one SSD, a stripe data from an address mapping table of the spare SSD; recovering, by the at least one SSD, lost data by performing the auto-rebuild operation without intervention from the host device; and sending, by the at least one SSD, an auto-rebuild complete command to the host device after performing the auto-rebuild operation.

In some other example embodiments, the method includes receiving, by at least one SSD of the plurality of SSDs, an auto-rebuild command from the host device in response to an IO error corresponding to a failure of the at least one SSD, the auto-rebuild command requesting performance of an auto-rebuild operation, the auto-rebuild command including information about a spare SSD of the plurality of SSDs; reading, by the at least one SSD, a stripe data from an address mapping table of the spare SSD; recovering, by the at least one SSD, lost data by performing the auto-rebuild operation without intervention from the host device; and sending, by the at least one SSD, an auto-rebuild complete command to the host device after performing the auto-rebuild operation.

In some other example embodiments, the method includes enabling, by the host device, a snapshot feature for at least one SSD of the plurality of SSDs to manage snapshot data of an address mapping table; sending, by the host device, a snapshot version and a timestamp to the at least one SSD to retrieve the snapshot data of the address mapping table; and receiving, by the host device, the snapshot data from the at least one SSD based on the snapshot version and the timestamp.

In some other example embodiments, the method includes detecting, by at least one SSD of the plurality of SSDs, a match between a snapshot version and a timestamp; and triggering, by the at least one SSD, the plurality of SSDs to create a snapshot of an address mapping table, in response to detecting the match.

Accordingly, at least some example embodiments herein provide a host device, coupled to a plurality of solid-state drives (SSDs), in a Redundant Array of Independent Disks (RAID) data storage system. The host device includes a memory, a processor and an auto-rebuild engine. The auto-rebuild engine is configured to detect a failure of at least one SSD from the plurality of SSDs and configure an address mapping table comprising stripe data at a spare SSD. Further, the auto-rebuild engine is also configured to indicate an auto-rebuild command to each SSD in the plurality of SSDs for performing an auto-rebuild operation, where the auto-rebuild command comprises information about the spare SSD and receive an auto-rebuild complete command from each of the SSDs.

Accordingly the example embodiments herein provide a host device, coupled to a plurality of solid-state drives (SSDs), in a Redundant Array of Independent Disks (RAID) data storage system. The host device includes a memory, a processor and a snapshot engine. The snapshot engine is configured to enable a snapshot feature for at least one SSD from the plurality of SSDs to manage a snapshot of an address mapping table and send a snapshot version and a timestamp to the at least one SSD to retrieve a snapshot data from the address mapping table. The snapshot engine is also configured to receive the snapshot data from the at least one SSD based on the snapshot version and the timestamp.

Accordingly the example embodiments herein provide a host device, coupled to a plurality of solid-state drives (SSDs), in a Redundant Array of Independent Disks (RAID) data storage system. The host device includes a memory, a processor and an auto-error correction engine. The auto-error correction engine is configured to detect an IO error and configure an auto-error correction request comprising metadata information about the IO error. Further, the auto-error correction engine is also configured to send an auto-error correction to each SSD in the plurality of SSDs for performing an auto error correction operation and receive an auto-error correction complete command from each of the SSDs.

Accordingly the example embodiments herein provide a SSD, coupled to host device, in a Redundant Array of Independent Disks (RAID) data storage system comprising a plurality of solid-state drives (SSDs). The SSD includes a memory, a processor and an auto-rebuild engine. The auto-rebuild engine is configured to receive an auto-rebuild command from the host device for performing an auto-rebuild operation, wherein the auto-rebuild command comprises information about a spare SSD and read a stripe data stored at an address mapping table of the spare SSD. Further, the auto-error correction engine is also configured to recover lost data by performing an auto-rebuild operation without intervention from the host device and send an auto-rebuild complete command to the host device.

Accordingly, the example embodiments herein provide a SSD, coupled to host device, in a Redundant Array of Independent Disks (RAID) data storage system comprising a plurality of solid-state drives (SSDs). The SSD includes a memory, a processor and a snapshot engine. The snapshot engine is configured to determine a match between a snapshot version and a timestamp and trigger to create a snapshot of an address mapping table in response to detecting the match.

Accordingly, the example embodiments herein provide a SSD, coupled to host device, in a Redundant Array of Independent Disks (RAID) data storage system comprising a plurality of solid-state drives (SSDs). The SSD includes a memory, a processor and an auto-error correction engine. The auto-error correction engine is configured to receive an auto-error correction request from the host device for performing an auto-error correction operation, where the auto-error correction request comprises information about an IO error. Further, the auto-error correction engine is also configured to recover data by performing the auto-error correction operation based on the IO operation and send an auto-error correction complete command to the host device.

These and other aspects of the example embodiments herein will be better appreciated and understood when considered in conjunction with the following description and the accompanying drawings. It should be understood, however, that the following descriptions, while indicating some example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF FIGURES

Example embodiments are illustrated in the accompanying drawings, throughout which like reference letters indicate corresponding parts in the various figures. The example embodiments herein will be better understood from the following description with reference to the drawings, in which.

DETAILED DESCRIPTION

Various example embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the example embodiments described herein can be made without departing from the scope and spirit of the present disclosure. In addition, descriptions of well-known functions and constructions are omitted for clarity and conciseness.

Also, the various example embodiments described herein are not necessarily mutually exclusive, as some example embodiments can be combined with one or more other example embodiments to form new embodiments.

Herein, the term "or" as used herein, refers to a non-exclusive or, unless otherwise indicated. The examples used herein are intended merely to facilitate an understanding of ways in which the example embodiments herein can be practiced and to further enable those skilled in the art to practice the example embodiments herein. Accordingly, the examples should not be construed as limiting the scope of the example embodiments herein.

As is traditional in the field, example embodiments may be described and illustrated in terms of blocks which carry out a described function or functions. These blocks, which may be referred to herein as units, engines, manager, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the example embodiments may be physically separated into two or more interacting and discrete blocks without departing from the scope of the disclosure. Likewise, the blocks of the example embodiments may be physically combined into more complex blocks without departing from the scope of the disclosure.

Accordingly, the example embodiments herein provide a method for controlling operations of a Redundant Array of Independent Disks (RAID) data storage system comprising a host device and a plurality of solid-state drives (SSDs). The method includes performing, by the at least one SSD, recovery of lost data by performing an auto-rebuild operation. The method also includes performing by the at least one SSD, an auto-error correction operation based on an IO error. The method also includes creating a snapshot of an address mapping table by all SSDs of the plurality of SSDs in the RAID data storage system. The auto-rebuild operation, the auto-error correction operation and the creation the snapshot of the address mapping table are all performed without the intervention from the host device.

In an example embodiment, the method includes detecting, by the host device, an IO error, and detecting, by the host device, whether the IO error correspond to a failure of at least one SSD of the plurality of SSDs. Further, the method includes performing one of an auto-error correction or an auto-rebuild operation based on a result of detecting whether the IO error corresponds to a failure of the at least one SSD.

For example, when the IO error does not corresponds to the failure of the at least one SSD of the plurality of SSD, the method may include configuring, by the host device, an auto-error correction request comprising a metadata information about the IO error; and sending, by the host device, an auto-error correction command to each SSD in the plurality of SSDs for performing an auto error correction operation, s.

Further, when the IO error corresponds to the failure of the at least one SSD of the plurality of SSDs, the method may include configuring, by the host device, an address mapping table comprising stripe data at a spare SSD; indicating, by the host device, an auto-rebuild command to each SSD in the plurality of SSDs for performing an auto-rebuild operation, wherein the auto-rebuild command comprises information about the spare SSD.

Furthermore, the method includes receiving, by the host device, an IO-error correction complete command from each of the SSDs after the SSDs perform the auto-error correction or the auto-rebuild operation.

In an example embodiment, the plurality of SSDs belongs to a single RAID group.

In an example embodiment, the address mapping table comprising the stripe data is configured in a Controller memory buffer (CMB) of the spare disc, and wherein the address mapping table is dynamically updated with the host device before indicating the auto-rebuild command to the SSDs.

In an example embodiment, the stripe data indicates addresses of consecutive segments of logically sequential data stored at each of the SSDs.

Referring now to the drawings where similar reference characters denote corresponding features consistently throughout the figures, there are shown some example embodiments.

Figure 1:
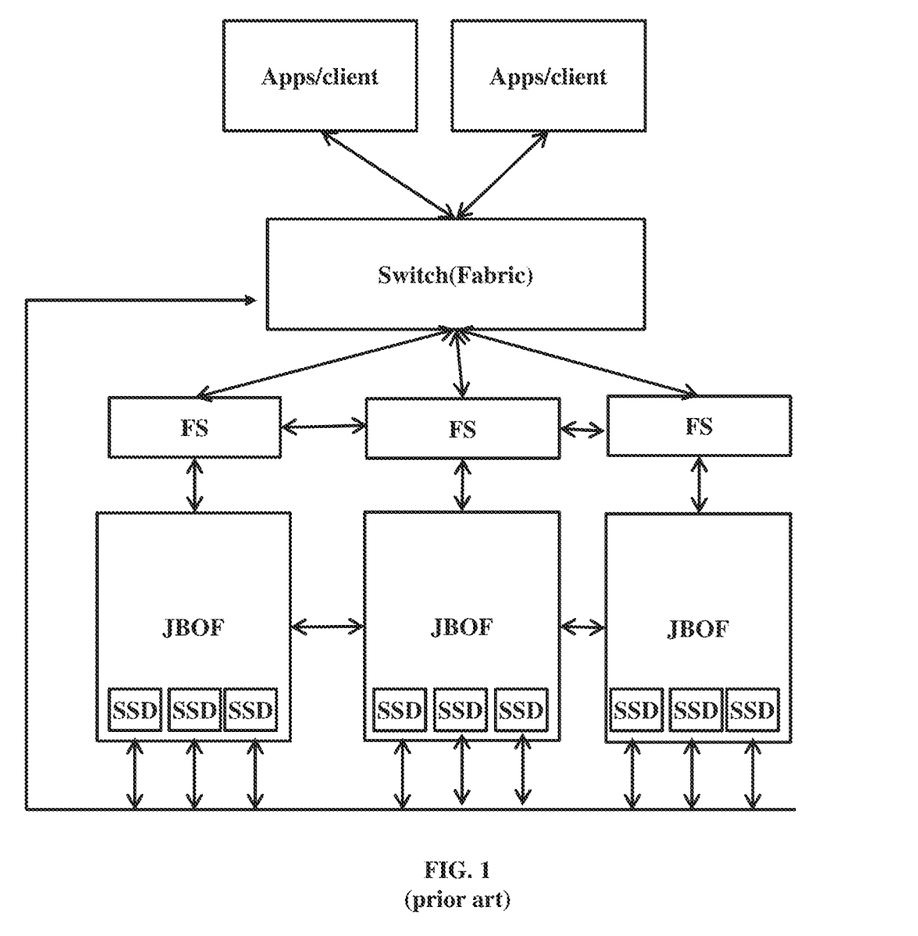
FIG. 1 is an example illustrating a conventional NVM express over Fabrics (NVMf) all flash array.

FIG. 1 is an example illustrating a conventional NVM express over Fabrics (NVMf) all flash array.

Referring to FIG. 1, a full flash array such as an All Flash Array (AFA) may include a disk set (i.e., Just Bunch of Flash (JBOF)) where each JBOF includes a plurality of solid state drives (SSDs). The JBOFs are connected together by a fabric switch. In case one of the SSDs in the plurality of SSDs encounter an IO error, such as a single disk failure, then a host device may enter into a maintenance mode. In the maintenance mode, the host device may rebuild the data that is lost by manually reading the data from each of the SSDs of the plurality of SSDs. However, the host device performing the rebuild operation involves a significant overhead which may adversely impact the overall performance of the host device.

Figure 2:
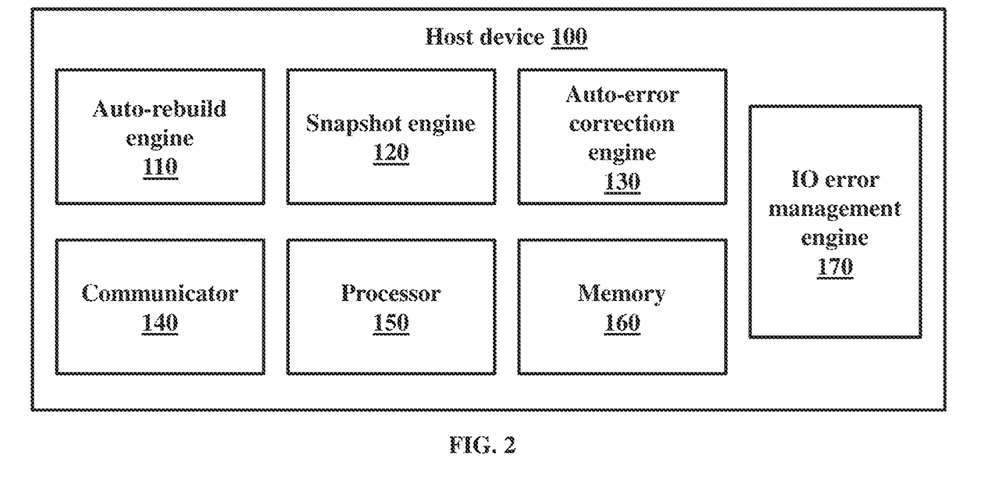
FIG. 2 is a block diagram of a host device, coupled to a plurality of solid-state drives (SSDs), in a Redundant Array of Independent Disks (RAID) data storage system, according to an example embodiment as disclosed herein.

FIG. 2 is a block diagram of a host device 100, coupled to the plurality of SSDs, in the RAID data storage system, according to an example embodiment as disclosed herein.

A RAID data storage system may include a host device 100 and a plurality of SSDs. Each of the SSDs of the plurality of SSDs may be configured to receive read and/or write requests from the host device 100. Further, the plurality of SSDs may be considered data storage locations, which are addressable as rows and columns in an array.

In an example embodiment, the host device 100 includes an Auto-rebuild engine 110, a snapshot engine 120, an auto-error correction engine 130, a communicator 140, a processor 150, a memory 160 and an IO error management engine 170.

IO Error Management Engine

In an example embodiment, the IO error management engine 170 is configured to detect an occurrence of an IO error in response to the host device 100 not being able to perform an input/output action (such as reading data, copying data, etc.) when the host device 100 is trying to access the at least one of the SSDs in the RAID data storage group. The IO error can also be because of the failure of one of the SSDs in the RAID data storage system. The IO error can be for example Latent sector errors (LSEs), which occur when a given sector within the SSD or an entire SSD within the RAID data storage system is inaccessible. Due to the LSE, a read or write operation may not be performed for the given sector. In addition, there may be an uncorrectable error-correction code (ECC) error.

Further, the IO error management engine 170 is also configured to detect whether the IO error corresponds to the failure of the at least one SSD of the plurality of SSDs. On determining that the IO error corresponds to the failure of the at least one SSD of the plurality of SSDs, the IO error management engine 170 may shift control to the auto-rebuild engine 110. In contrast, on determining that the IO error does not correspond to the failure of the at least one SSD of the plurality of SSDs, the IO error management engine 170 may shift control to the auto-error correction engine 130.

Further, the IO error management engine 170 is also configured to receive the IO-error correction complete command from each of the SSDs. The IO-error correction complete command is an auto-error correction complete command when the IO error does not correspond to the failure of the at least one SSD of the plurality of SSDs. The IO-error correction complete command is an auto-rebuild complete command when the IO error corresponds to the failure of the at least one SSD of the plurality of SSDs.

Auto-Rebuild Engine

In an example embodiment, the auto-rebuild engine 110 is configured to detect the failure of the at least one SSD from the plurality of SSDs, and to configure the address mapping table including the stripe data at a spare SSD. The spare SSDs may be used for disk mirroring, backup and restore, archival and retrieval of archived data, and data migration from one SSD to the other SSD.

Further, the auto-rebuild engine 110 is also configured to send the auto-rebuild command to each of the SSDs in the plurality of SSDs for performing the auto-rebuild operation. Further, the auto-rebuild engine 110 waits for the completion of the auto-rebuild operation by the SSDs. The auto-rebuild command includes the information about the spare SSD. The address mapping table includes the stripe data and the address mapping table is configured in a Controller memory buffer (CMB) of the spare SSD. The host device 100 may dynamically update the address mapping table before transmitting the auto-rebuild command to the SSDs. The stripe data in the address mapping table indicates addresses of consecutive segments of logically sequential data stored at each of the SSDs.

Snapshot Engine

In an example embodiment, the snapshot engine 120 is configured to enable a snapshot feature for the at least one SSD from the plurality of SSDs to create the snapshot of the address mapping table. Further, the snapshot engine 120 is also configured to send a snapshot version and a timestamp to the at least one SSD to retrieve the matching snapshot data from the address mapping table. The snapshot engine 120 is also configured to receive the snapshot data from the at least one SSD based on the snapshot version and the timestamp. The address mapping table includes the snapshot data of the at least one SSD, the time stamp, and the snapshot version.

Auto-Correction Engine

In an example embodiment, the auto-error correction engine 130 configures the auto-error correction request to include metadata information about the IO error. Further, the auto-error correction engine 130 is also configured to send the auto-error correction command to each of the SSDs in the plurality of SSDs for performing the auto error correction operation. Further, the auto-error correction engine 130 waits for the completion of the auto error correction operation by the SSDs.

In an example embodiment, the communicator 140 is configured to communicate with, for example, a cloud system, a central server and/or other applications in the host device 100. The protocols used for communication can be for example, Bluetooth, Near Field Communication (NFC), ZigBee, RuBee, and Wireless Local Area Network (WLAN) functions, etc.

In an example embodiment, the processor 150 is configured to interact with the hardware elements such as the auto-rebuild engine 110, the snapshot engine 120, the auto-error correction engine 130, the communicator 140, the memory 160 and the IO error management engine 170.

In some example embodiments, the memory 160 may contain instructions that, when executed by the processor 150, configure the processor 150 as a special purpose processor to perform the functions of one or more of auto-rebuild engine 110, the snapshot engine 120, the auto-error correction engine 130, and the communicator 140. For example, as discussed in more detail below, the special purpose processor may be configured to improve the functioning of the RAID data storage system by initiating a reclamation procedure and offloading the rest of the reclamation process to the SSDs and/or initiating a snapshot process and offloading a rest of the snapshot process to the plurality of SSDs, thereby reducing the processing time and power requirement of the host device 100.

In an example embodiment, the memory 160 can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 160 may, in some examples, be considered a non-transitory storage medium. The term "non-transitory" may indicate that the storage medium is not embodied in a carrier wave or a propagated signal. However, the term "non-transitory" should not be interpreted that the memory 160 is non-movable. In certain examples, a non-transitory storage medium may store data that can, over time, change (e.g., in Random Access Memory (RAM) or cache).

Although FIG. 2 shows elements of the host device 100, it is to be understood that the example embodiments are not limited thereon. In other example embodiments, the host device 100 may include less or more elements. Further, the labels or names of the elements are used only for illustrative purpose and does not limit example embodiments. One or more components can be combined together to perform same or substantially similar function for controlling operations of the RAID data storage system.

Figure 3:
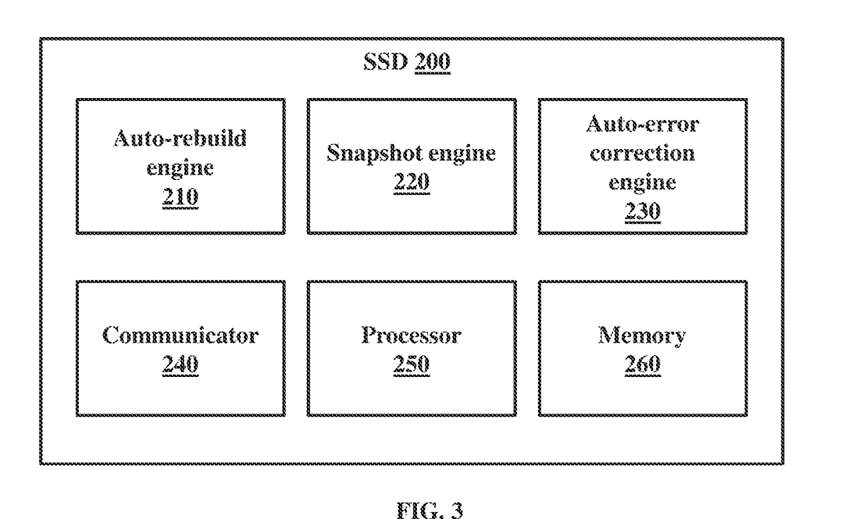
FIG. 3 is a block diagram of a SSD coupled to host device, in a Redundant Array of Independent Disks (RAID) data storage system comprising a plurality of solid-state drives (SSDs, according to an example embodiment as disclosed herein.

FIG. 3 is a block diagram of a SSD 200 coupled to host device 100 in the RAID data storage system that includes the plurality of solid-state drives SSDs, according to an example embodiment as disclosed herein.

Referring to FIG. 3, the SSD 200 utilizes Flash memory cells. A Flash memory cell holds a binary value based on a range of electrons trapped and stored in a floating gate. A fully erased Flash memory cell stores no or a minimal number of electrons in the floating gate. A particular binary value, such as binary 1 for single-level cell (SLC) Flash, is associated with an erased Flash memory cell. A multi-level cell (MLC) Flash has a binary value 11 associated with an erased Flash memory cell. After applying a voltage higher than a given threshold voltage to a controlling gate within a Flash memory cell, the Flash memory cell traps a given range of electrons in the floating gate.

In an example embodiment, the SSD 200 includes an auto-rebuild engine 210, a snapshot engine 220, an auto-error correction engine 230, a communicator 240, a processor 250 and a memory 260.

The SSD may include both stored data to be modified and accessed by end-users and inter-device error-correction code (ECC) data. The inter-device ECC data may be parity information generated from the other SSDs in the RAID data storage system. For example, the inter-device ECC data may be parity information used in the RAID data storage system.

Auto-Rebuild Engine

In an example embodiment, the auto-rebuild engine 210 is configured to receive the auto-rebuild command from the host device 100 for performing the auto-rebuild operation. The auto-rebuild command may include information about the spare SSD in the JBOF of the RAID data storage system. Further, the auto-rebuild engine 210 is also configured to read the stripe data stored at the address mapping table of the spare SSD and recover the lost data by performing the auto-rebuild operation without any intervention from the host device 100. The auto-rebuild operation includes retrieving the data from the plurality of SSDs other than the failed SSD and determining a parity which is used to recover the lost data. Further, once the auto-rebuild operation is completed, the auto-rebuild engine 210 is configured to send the auto-rebuild complete command to the host device 100. Each of the SSDs in the RAID data storage system receives the auto-rebuild command from the host device 100 when at least one of SSD from the plurality of SSDs in the RAID data storage system has failed and the data from the failed SSD has to be recovered.

Snapshot Engine

In an example embodiment, the snapshot engine 220 is configured to determine the match between the snapshot version and the timestamp of the snapshot data in the address mapping table, received from the host device 100. Further, the snapshot engine 220 is also configured to trigger to create the snapshot of the address mapping table by all the SSDs of the plurality of SSDs in the RAID data storage system, in response to detecting the match. The address mapping table includes the snapshot data of the RAID data storage system, the time stamp and the snapshot version. The snapshot feature for all the SSDs of the plurality of SSDs in the RAID data storage system is enabled by the host device 100. However, the host device 100 does not create the snapshot and offloads the feature of creation of the snapshot to all the SSDs in the RAID data storage system.

In another example embodiment, the snapshot engine 220 is configured to determine a number of free blocks and detect whether the snapshot frequency meets a garbage collection (GC) criteria. On determining that the GC criteria are met, the snapshot engine 220 is configured to initiate a GC operation. The GC operation will erase the dirty data from the at least one SSD to increase the number of free blocks to store a new data. The dirty data is the data which is stored in the data blocks for long period of time and is not used by any application in RAID data storage system. Therefore, the dirty data is used for snapshotting.

In an example embodiment, the auto-error correction engine 230 is configured to receive the auto-error correction request from the host device 100 for performing the auto-error correction operation. The auto-error correction request include information about the IO error. Further, the auto-error correction engine 230 is configured to recover the data from the failed SSD by performing the auto-error correction operation based on the IO error. The auto-error correction operation includes reading the data from the failed SSD using the peer-to-peer communication based on the meta information which is received from the host device 100 and computing the parity which is used to recover the lost data from the failed SSD. Further, the auto-error correction engine 230 is also configured to send the auto-error correction complete command to the host device 100 after the auto-error correction operation has been completed at the SSD 200 end.

In an example embodiment, the communicator 240 is configured to can be configured to communicate with for example a cloud system, central server and other applications in the host device 100. The protocols used for communication can be for example, Bluetooth, Near Field Communication (NFC), ZigBee, RuBee, and Wireless Local Area Network (WLAN) functions, etc.

In an example embodiment, the processor 250 is configured to interact with the hardware elements such as the auto-rebuild engine 210, the snapshot engine 220, the auto-error correction engine 230, the communicator 240 and the memory 260.

In some example embodiments, the memory 260 may contain instructions that, when executed by the processor 250, configure the processor 250 as a special purpose processor to perform the functions of one or more of auto-rebuild engine 210, the snapshot engine 220, the auto-error correction engine 230, and the communicator 240. For example, as discussed in more detail below, the special purpose processor may be configured to improve the functioning of the RAID data storage system by after the host device 100 initiates a reclamation procedure, performing the rest of the reclamation process and/or after the host device 100 initiates a snapshot process, performing a rest of the snapshot process, thereby reducing the processing time and power requirement of the host device 100.

In an example embodiment, the memory 260 can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 260 may, in some examples, be considered a non-transitory storage medium. The term "non-transitory" may indicate that the storage medium is not embodied in a carrier wave or a propagated signal. However, the term "non-transitory" should not be interpreted that the memory 260 is non-movable. In some examples, the memory 260 is configured to store larger amounts of information than the memory. In certain examples, a non-transitory storage medium may store data that can, over time, change (e.g., in Random Access Memory (RAM) or cache).

Although the FIG. 3 shows the hardware elements of the SSD 200 but it is to be understood that the example embodiments are not limited thereto. In other example embodiments, the SSD 200 may include less or more number of elements. Further, the labels or names of the elements are used only for illustrative purpose and does not limit the scope of the example embodiment. One or more components can be combined together to perform same or substantially similar function of controlling operations of the RAID data storage system.

Figure 4:
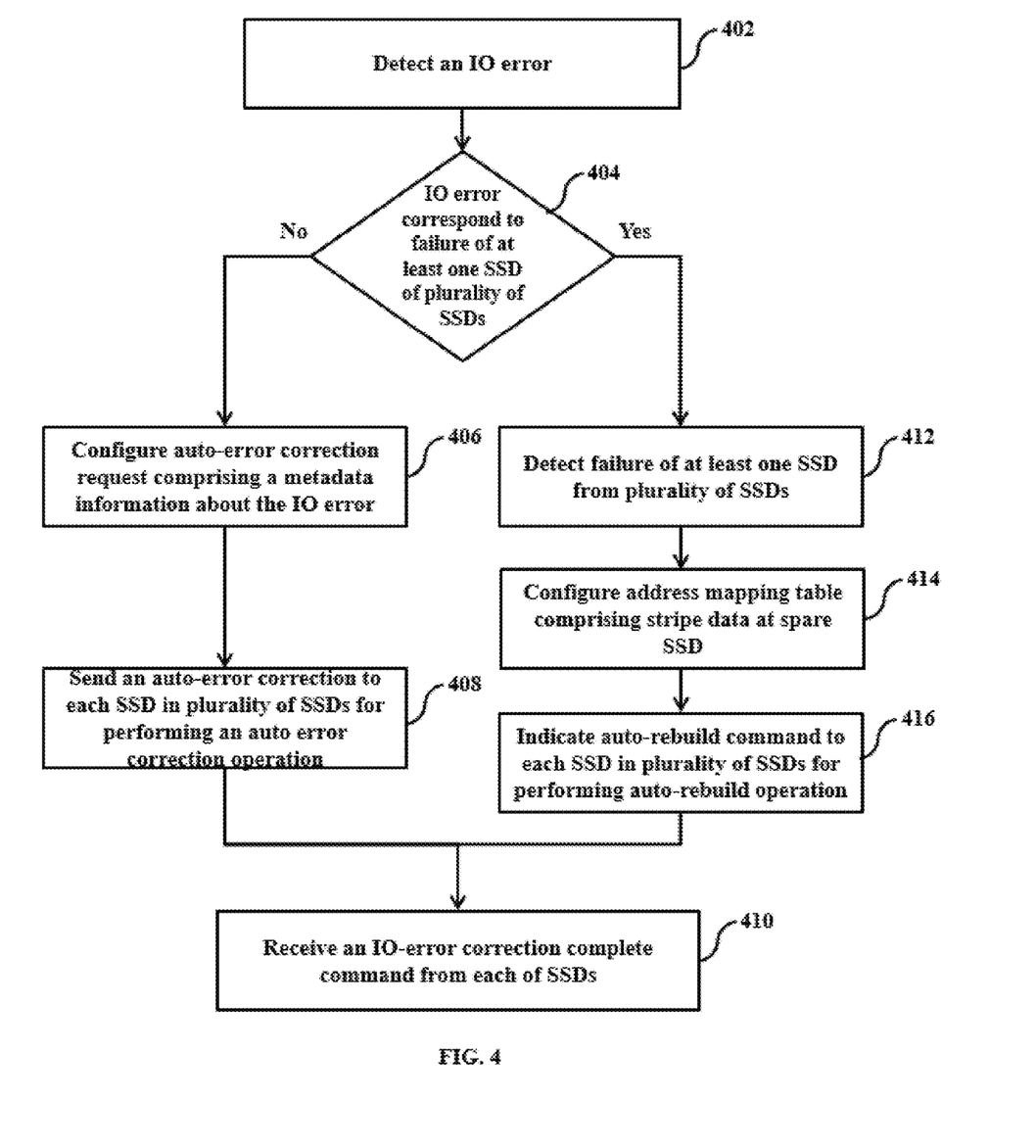
FIG. 4 is a flow chart illustrating a method for initiating an auto-rebuilding operation by the host device, according to an example embodiment as disclosed herein.

FIG. 4 is a flow chart illustrating a method for initiating IO-error correction operation by the host device 100, according to an example embodiment as disclosed herein.

Referring to the FIG. 4, at operation 402, the host device 100 detects the IO error. For example, in the host device 100 as illustrated in the FIG. 2, the IO error management engine 170 is configured to detect the IO error.

At operation 404, the host device 100 detects whether the IO error corresponds to the failure of at least one SSD of the plurality of SSDs. For example, in the host device 100 as illustrated in the FIG. 2, the IO error management engine 170 is configured to detect whether the IO error correspond to the failure of at least one SSD of the plurality of SSDs.

I/O Error

In response to detecting that the IO error does not corresponds to the failure of the at least one SSD of the plurality of SSDs, at operation 406, the host device 100 configures the auto-error correction request that includes the metadata information about the IO error. For example, in the host device 100 as illustrated in the FIG. 2, the auto-error correction engine 130 can be configured to configure the auto-error correction request that includes the metadata information about the IO error. The metadata information is used to perform the peer-to-peer communication by the SSD for auto-error correction.

At operation 408, the host device 100 sends the auto-error correction request to each SSD in the plurality of SSDs 200 for performing the auto error correction operation. For example, in the host device 100 as illustrated in the FIG. 2, the auto-error correction engine 130 can be configured to send the auto-error correction request to each SSD in the plurality of SSDs 200 for performing the auto error correction operation.

At operation 410, in response to the SSDs completing IO-error correction, the host device 100 receives the IO-error correction complete command from each of SSDs. For example, in the host device 100 as illustrated in the FIG. 2, the IO error management engine 170 is configured to receive the IO-error correction complete command from each of SSDs.

Failure in SSD

In response to detecting that the IO error corresponds to the failure of the at least one SSD of the plurality of SSDs, at operation 412, the host device 100 detects the failure of at least one SSD from plurality of SSDs. For example, in the host device 100 as illustrated in the FIG. 2, the auto-rebuild engine 110 can be configured to detect the failure of at least one SSD from plurality of SSDs.

At operation 414, the host device 100 configures the address mapping table including stripe data at spare SSD. For example, in the host device 100 as illustrated in the FIG. 2, the auto-rebuild engine 110 can be configured to configure the address mapping table that includes stripe data at spare SSD.

At operation 416, the host device 100 transmits the auto-rebuild command to each SSD in the plurality of SSDs for performing the auto-rebuild operation. For example, in the host device 100 as illustrated in the FIG. 2, the auto-rebuild engine 110 can be configured to transmit the auto-rebuild command to each SSD in the plurality of SSDs for performing the auto-rebuild operation.

At operation 410, in response to the SSDs performing the auto-rebuild operation, the host device 100 receives the IO-error correction complete command from each of SSDs. For example, in the host device 100 as illustrated in the FIG. 2, the IO error management engine 170 is configured to receive the IO-error correction complete command from each of SSDs.

The various actions, acts, blocks, steps, or the like in the method may be performed in the order presented, in a different order or simultaneously. Further, in some example embodiments, some of the actions, acts, blocks, steps, or the like may be omitted, added, modified, skipped, or the like without departing from the scope of the example embodiment.

Figure 5:
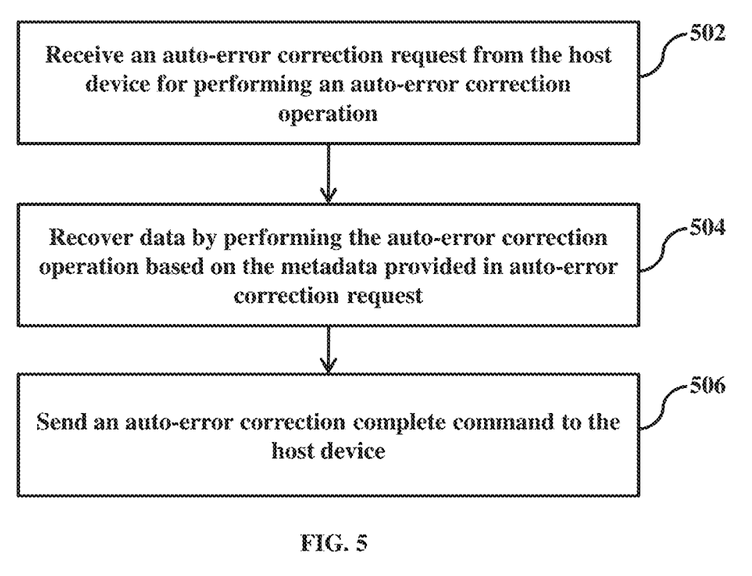
FIG. 5 is a flow chart illustrating a method for recovering by data by performing the auto-error correction operation by the at least one SSD, according to an example embodiment as disclosed herein.

FIG. 5 is a flow chart illustrating a method for recovering by data by performing the auto-error correction operation by the at least one SSD 200, according to an example embodiment as disclosed herein.

Referring to the FIGS. 4 and 5, at operation 502, the SSD 200 receives the auto-error correction request from the host device 100 for performing the auto-error correction operation. The SSD 200 may receive the auto-correction request in response to transmission of the same by the host device 100 in operation 408. For example, in the SSD 200 as illustrated in the FIG. 3, the auto-error correction engine 230 can be configured to receive the auto-error correction request from the host device 100 for performing the auto-error correction operation.

At operation 504, the SSD 200 recovers the data by performing the auto-error correction operation based on the metadata provided in the auto-error correction request. For example, in the SSD 200 as illustrated in the FIG. 3, the auto-error correction engine 230 can be configured to recover the data by performing the auto-error correction operation based on the metadata provided in the auto-error correction request. The auto-error correction operation includes reading the data from the plurality of SSDs in RAID group except the one SSD which has the IO error and recovering the data using the parity information.

At operation 506, the SSD 200 sends the auto-error correction complete command to the host device 100. The auto-error correction complete command may correspond to the IO-error correction complete command received by the host device 100 in operation 410. For example, in the SSD 200 as illustrated in the FIG. 3, the auto-error correction engine 230 can be configured to send the auto-error correction complete command to the host device 100.

The various actions, acts, blocks, steps, or the like in the method may be performed in the order presented, in a different order or simultaneously. Further, in some example embodiments, some of the actions, acts, blocks, steps, or the like may be omitted, added, modified, skipped, or the like without departing from the scope of the example embodiments.

Figure 6:
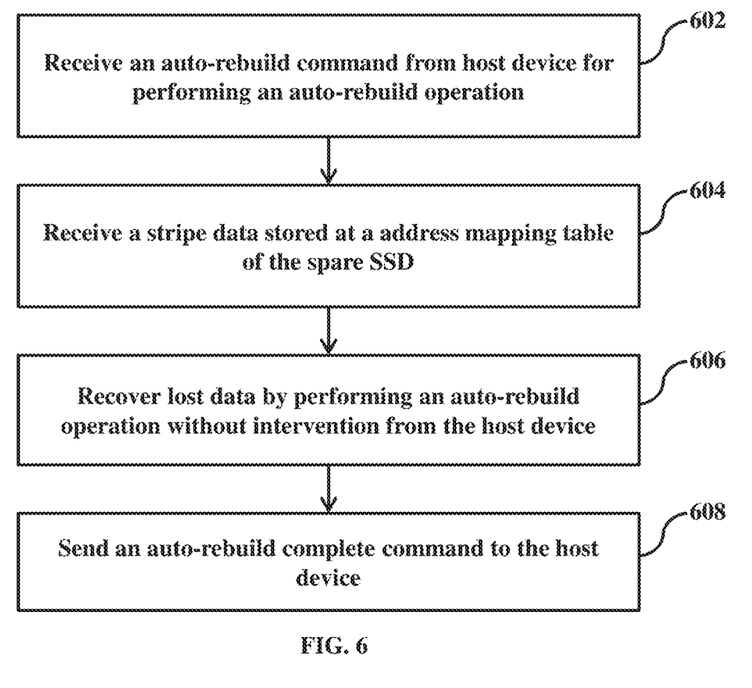
FIG. 6 is a flow chart illustrating a method for recovering lost data by performing an auto-rebuild operation without intervention from the host device, according to an example embodiment as disclosed herein.

FIG. 6 is a flow chart illustrating a method for recovering lost data by performing an auto-rebuild operation without intervention from the host device 100, according to an example embodiment as disclosed herein.

Referring to the FIG. 6, at operation 602, the SSD 200 receives the auto-rebuild command from host device 100 for performing the auto-rebuild operation. The auto-rebuild command may correspond to the auto-rebuild command transmitted by the host device 100 in operation 416. For example, in the SSD 200 as illustrated in the FIG. 3, the auto-rebuild engine 210 can be configured to receive the auto-rebuild command from host device 100 for performing the auto-rebuild operation.

At operation 604, the SSD 200 receives the stripe data stored at the address mapping table of the spare SSD. For example, in the SSD 200 as illustrated in the FIG. 3, the auto-rebuild engine 210 can be configured to receive the stripe data stored at the address mapping table of the spare SSD.

At operation 606, the SSD 200 recovers the lost data by performing the auto-rebuild operation without intervention from the host device 100. For example, in the SSD 200 as illustrated in the FIG. 3, the auto-rebuild engine 210 can be configured to recover the lost data by performing the auto-rebuild operation without intervention from the host device 100.

At operation 608, the SSD 200 sends the auto-rebuild complete command to the host device 100. The auto-rebuild complete command may correspond to the IO-error correction complete command received by the host device 100 in operation 410. For example, in the SSD 200 as illustrated in the FIG. 3, the auto-rebuild engine 210 can be configured to send the auto-rebuild complete command to the host device 100.

The various actions, acts, blocks, steps, or the like in the method may be performed in the order presented, in a different order or simultaneously. Further, in some example embodiments, some of the actions, acts, blocks, steps, or the like may be omitted, added, modified, skipped, or the like without departing from the scope of example embodiments.

Figure 7:
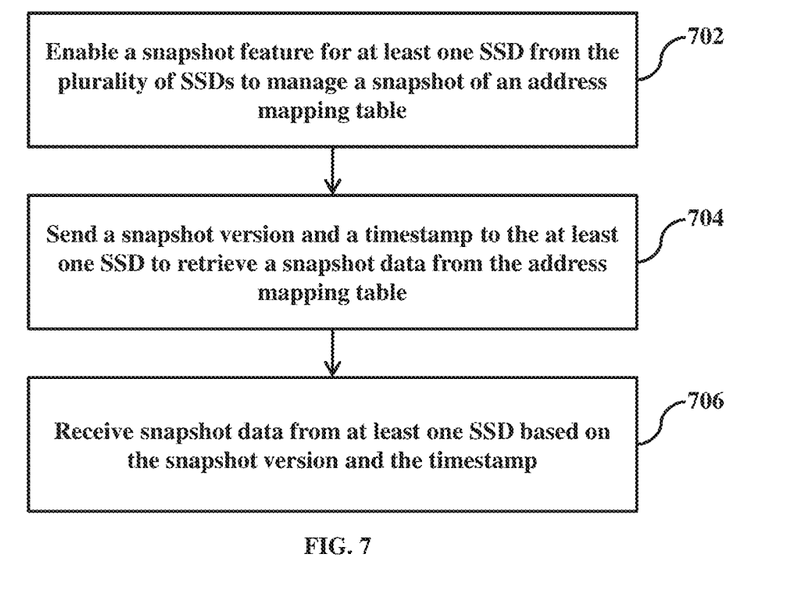
FIG. 7 is a flow chart illustrating a method for receiving snapshot data from the at least one SSD, according to an example embodiment as disclosed herein.

FIG. 7 is a flow chart illustrating a method for receiving snapshot data from the at least one SSD 200 by the host device 100, according to an example embodiment as disclosed herein.

Referring to the FIG. 7, at operation 702, the host device 100 enables a snapshot feature for at least one SSD 200 from the plurality of SSDs to manage a snapshot of an address mapping table. For example, in the host device 100 as illustrated in the FIG. 2, the snapshot engine 120 can be configured to enables a snapshot feature for at least one SSD 200 from the plurality of SSDs to manage a snapshot of an address mapping table.

At operation 704, the host device 100 sends the snapshot version and the timestamp to the at least one SSD to retrieve the snapshot data from the address mapping table. For example, in the host device 100 as illustrated in the FIG. 2, the snapshot engine 120 can be configured to send the snapshot version and the timestamp to the at least one SSD to retrieve the snapshot data from the address mapping table.

At operation 706, the host device 100 receives the snapshot data from the at least one SSD based on the snapshot version and the timestamp. For example, in the host device 100 as illustrated in the FIG. 2, the snapshot engine 120 can be configured to receive the snapshot data from the at least one SSD based on the snapshot version and the timestamp.

The various actions, acts, blocks, steps, or the like in the method may be performed in the order presented, in a different order or simultaneously. Further, in some example embodiments, some of the actions, acts, blocks, steps, or the like may be omitted, added, modified, skipped, or the like without departing from the scope of the example embodiments.

Figure 8:
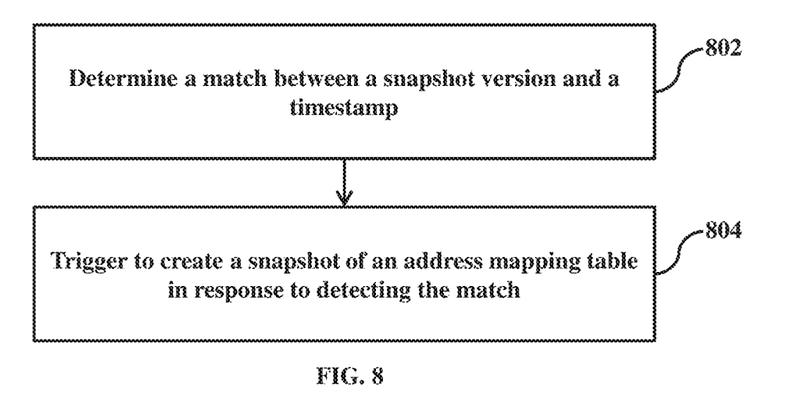
FIG. 8 is a flow chart illustrating a method for triggering to create a snapshot of an address mapping table by the at least one SSD, according to an example embodiment as disclosed herein.

FIG. 8 is a flow chart illustrating a method for triggering to create a snapshot of an address mapping table by the at least one SSD 200, according to an example embodiment as disclosed herein.

Referring to the FIG. 8, at operation 802, the SSD 200 determines a match between a snapshot version and a timestamp. The snapshot version and the timestamp may correspond to that transmitted by the host device 100 in operation 704.

For example, in the SSD 200 as illustrated in the FIG. 3, the snapshot engine 220 can be configured to determine the match between the snapshot version and the timestamp.

At operation 804, the SSD 200 triggers to create a snapshot of the address mapping table in response to detecting the match. For example, in the SSD 200 as illustrated in the FIG. 3, the snapshot engine 220 can be configured to trigger to create the snapshot of the address mapping table in response to detecting the match.

The various actions, acts, blocks, steps, or the like in the method may be performed in the order presented, in a different order or simultaneously. Further, in some example embodiments, some of the actions, acts, blocks, steps, or the like may be omitted, added, modified, skipped, or the like without departing from the scope of the example embodiments.

Figure 9:
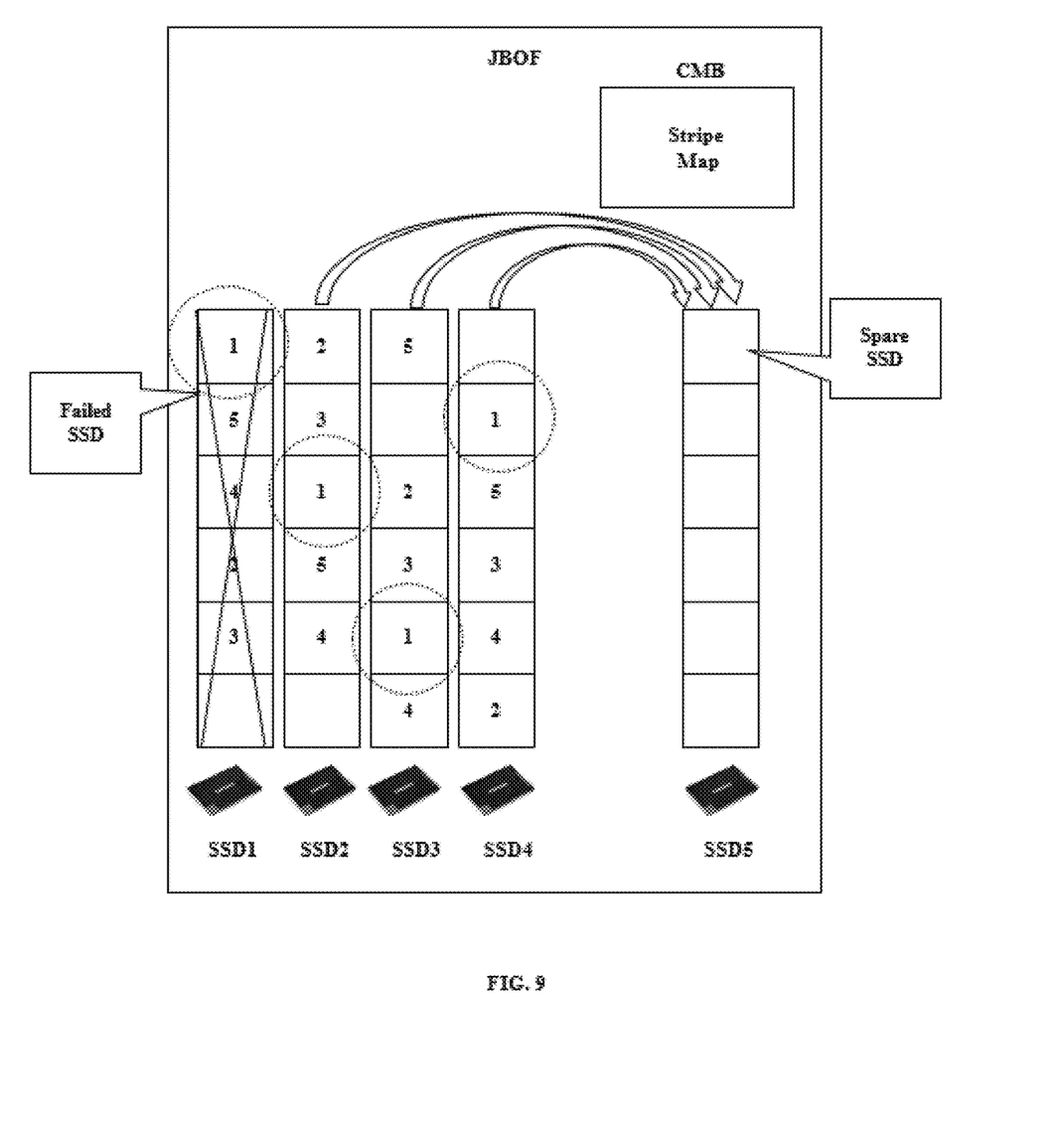
FIG. 9 is an example illustrating the auto-rebuild operation in a JBOF, according to an example embodiment as disclosed herein.

FIG. 9 is an example illustrating the auto-rebuild operation in the JBOF, according to an example embodiment as disclosed herein.

Referring to the FIG. 9, in a RAID group, the JBOF may include a plurality of SSDs where at least one of the SSDs may be a spare SSD. For example, the JBOF may include five SSDs i.e., SSD1, SSD2, SSD3, SSD4 and SSD5, as shown in FIG. 9, where SSD5 may be a spare SSD. The SSDs in the JBOF can have direct network connection via a NVMe, a fabric switch, a connector switch etc.

At least one of the SSDs in the JBOF may fail. For example, referring to the FIG. 9, SSD1 may fail.

In the conventional methods and systems, when one of the SSDs in the JBOF fails (e.g., SSD1), then the host device 100 goes into a maintenance mode where only read option is supported. In the maintenance mode, the host device 100 rebuilds the data lost from the SSD1 by manually reading the data from other SSDs i.e., the SSD2, the SSD3 and the SSD4. The host device 100 recovers the data from the SSD1 by performing, for example, an XOR operation on the data of the SSD2, the SSD3 and the SSD4; and computing a parity value, an ECC algorithm, or any other suitable algorithm. Further, the host device 100 writes the reclaimed data of the SSD1 into the spare SSD i.e., the SSD5. However, the process of reclaiming the data from the failed SSD involves the host device 100 performing the reclamation procedure.

Unlike to the conventional methods and systems, in one or more example embodiments, the host device 100 performs a limited role of initiating the reclamation procedure. Further, the reclamation procedure is independently carried on by the SSDs thereby reducing the processing time and power requirement of the host device 100.

Initially, the host device 100 configures the RAID group and the address mapping table in the controller memory buffer (CMB) of the spare SSD i.e., the SSD5. The host device 100 detects that the SSD1 has failed. After the SSD1 has failed, the SSD5, which is the spare SSD, is used to replace the SSD1 by writing the missing data blocks from the SSD1 into the SSD5. The rebuild process recreates the missing data and/or redundancy blocks in the stripe via degraded reads for the missing data blocks, and redundancy re-calculations for missing redundancy blocks. In response to detecting that the SSD1 has failed, the host device 100 shares the stripe address mapping to the CMB area of the SSD5.

The address mapping table includes the stripe data which indicates the addresses of the consecutive segments of logically sequential data stored at each of the four SSDs. Further, the host device 100 sends the auto-rebuild command to the SSD2, the SSD3, the SSD4 and the SSD5 for performing the auto-rebuild operation. Further, the auto-rebuild command sent by the host device 100 includes details about the spare SSD i.e., the SSD5. The SSD5 on receiving the auto-rebuild command from the host device 100 for performing the auto-rebuild operation reads the data from the SSD2, the SSD3, and the SSD4. Further, the lost data is recovered by performing the auto-rebuild operation without any intervention from the host device 100. The auto-rebuild operation includes performing the XOR operation of the data stored in the SSD2, the SSD3, the SSD4 and computing the parity value to recover the lost data. On completion of the auto-rebuild operation the auto-rebuild complete command is sent to the host device 100 for acknowledgment by the SSD5.

Figure 10:
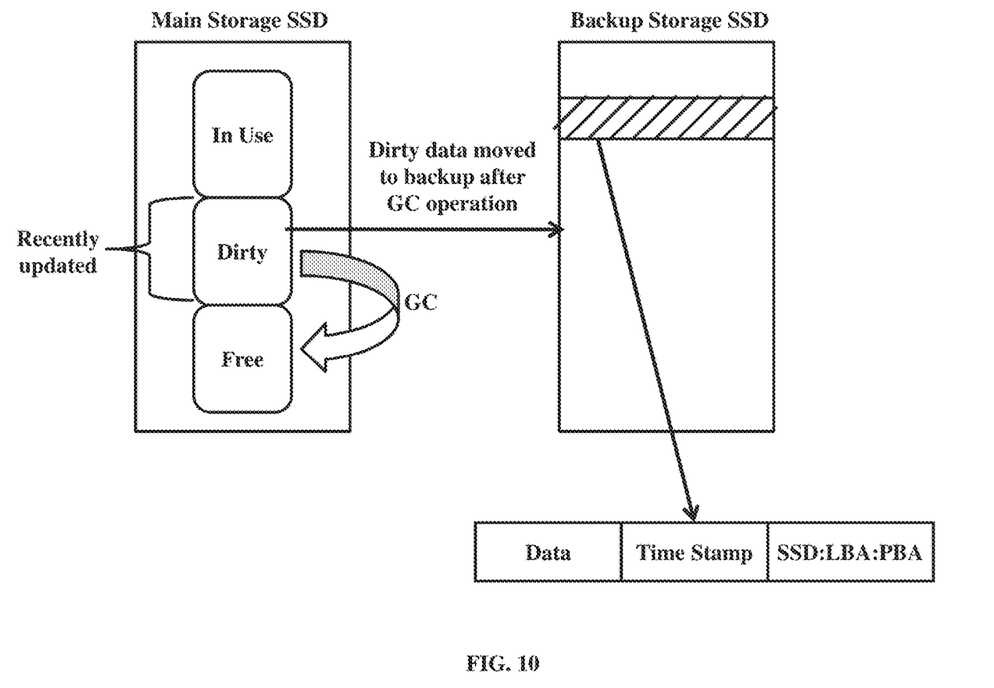
FIG. 10 is an example illustrating the creation of the snapshot of the address mapping table by the at least one SSD, according to an example embodiment as disclosed herein.

FIG. 10 is an example illustrating the creation of the snapshot of the address mapping table by the at least one SSD, according to an example embodiment as disclosed herein.

Garbage collection (GC) is a process in which the storage locations in the SSDs are freed from dirty data and made available for reuse by the host device 100. In the absence of garbage collection, all storage locations will eventually appear to be in use and it may no longer be possible to allocate storage.

The dirty data is the data in the storage locations which was overwritten with the updated data and may be no longer required for any of the applications. However, the dirty data is used in snapshotting. In the conventional methods and systems, the process of garbage collection is performed by the host device 100 which involves a significant overhead and adversely impacts the overall performance of the host device 100. The snapshotting is a process of determining a fully usable copy of the specified data set which includes copying the data at a certain time point (timestamp) provided by the host device 100. The host device 100 also updates the address mapping relationship between a logical address and physical address data in the address mapping table. Further, host device 100 also creates a new snapshot of the address mapping table.

For example, a system may include a main storage SSD and a backup SSD, as shown in FIG. 10. The main storage SSD may be located in the JBOF to which the main storage SSD belongs or in a different JBOF.

In the conventional methods and systems, the host device 100 is involved in the process of garbage collection i.e., obtaining a difference of the updated data and the past data; and further storing the difference data in the backup storage SSD. Further, the host device 100 is also involved in moving the data in and out of the backup storage SSD.

Unlike to the conventional methods and systems, in one or more example embodiments, the host device 100 does not perform the snapshot process. Rather the host device 100 only initiates the snapshot process and the plurality of SSDs performs the snapshot process.

The host device 100 enables the snapshot feature for the backup storage SSD to manage a snapshot of the address mapping table. Further, the host device 100 sends a snapshot version and a timestamp to the backup storage SSD to receive the snapshot data from the address mapping table. The backup storage SSD may also receive a volume ID, a logical address or virtual address associated with a request, a snapshot ID, a sector number, and so forth. The address mapping table includes the snapshot data of the main storage SSD, the time stamp, and the snapshot version. Further, the address mapping table is located in the backup storage SSD.

On receiving the snapshot version and the timestamp, the backup storage SSD identifies that the number of free blocks and determines whether the snapshot frequency meets the GC criteria and starts the GC operation. Further, the backup storage SSD determines the match between the snapshot version and the timestamp received from the host device 100 and in response creates the snapshot of the address mapping table. The address mapping table is used to store the snapshot data of the SSDs in the RAID group which also includes the main storage SSD, the time stamp, and the snapshot version. The main storage SSD transfers the dirty data to the backup storage SSD in the background every time the updated data is available, without any intervention of the host device 100. When the host device 100 needs the snapshot of the address mapping table, the host device 100 only has to enable the snapshot feature for the main storage SSD.

In case the GC operation is not concerned about the snapshot feature being enabled for the main storage SSD, the GC operation running on the main storage SSD may erase critical data from the main storage SSD for which the backup has not been created. Therefore, the host device 100 has to ensure that the GC operation is not performed on the SSDs (main storage SSD in the example) in which the snapshot feature is enabled until the backup is created for the critical data. Further, once the backup for the critical data in the main storage SSD is created, the GC operation can be performed on the main storage SSD to erase the critical data (which might be dirty data as it is not required by any of the applications).

The foregoing description of some of the example embodiments will so fully reveal the general nature of the example embodiments herein that others can, by applying current knowledge, readily modify and/or adapt for various applications such example embodiments without departing therefrom, and, therefore, such adaptations and modifications should and are intended to be comprehended within the meaning and range of equivalents of the disclosed example embodiments. It is to be understood that the phraseology or terminology employed herein is for the purpose of description and not of limitation. Therefore, while example embodiments herein have been described in terms of some example embodiments, those skilled in the art will recognize that the example embodiments herein can be practiced with modification within the spirit and scope of the example embodiments as described herein.

We claim:

1. A method of controlling operations of a Redundant Array of Independent Disks (RAID) data storage system, the RAID data storage system including a host device and a plurality of solid-state drives (SSDs), the method comprising:
  detecting, by the host device, an IO error;
  determining, by the host device, whether the IO error corresponds to a failure of at least one SSD of the plurality of SSDs; and
  in response to the IO error corresponding to the failure of the at least one SSD,
    configuring, by the host device, an address mapping table such that the address mapping table includes stripe data at a spare SSD,
    transmitting, by the host device, an auto-rebuild command to the plurality of SSDs, the auto-rebuild command instructing the plurality of SSDs to perform an auto-rebuild operation such that the auto-rebuild command includes information about the spare SSD, and
    receiving, by the host device, an IO-error correction complete command from each of the plurality of SSDs.

2. The method of claim 1, wherein, in response to the determining that the IO error does not correspond to the failure of the at least one SSD, the method comprises:
  configuring, by the host device, an auto-error correction request such that the auto-error correction request includes metadata information about the IO error; and
  sending, by the host device, the auto-error correction request to each SSD in the plurality of SSDs for performing an auto error correction operation.

3. The method of claim 1, wherein the plurality of SSDs belong to a single RAID group.

4. The method of claim 1, wherein the stripe data in the address mapping table is stored in a Controller memory buffer (CMB) of the spare SSD, and wherein the method further comprises:
  dynamically updating, by the host device, the address mapping table before transmitting the auto-rebuild command to the plurality of SSDs.

5. The method of claim 1, wherein the stripe data indicates addresses of consecutive segments of logically sequential data stored at respective ones of the plurality of SSDs.

6. A method of controlling operations of a Redundant Array of Independent Disks (RAID) data storage system, the RAID data storage system including a host device and a plurality of solid-state drives (SSDs), the method comprising:
  receiving, by at least one SSD of the plurality of SSDs, an auto-rebuild command from the host device in response to an IO error corresponding to a failure of the at least one SSD, the auto-rebuild command requesting performance of an auto-rebuild operation, the auto-rebuild command including information about a spare SSD of the plurality of SSDs;
  reading, by the at least one SSD, stripe data from an address mapping table of the spare SSD;
  recovering, by the at least one SSD, lost data by performing the auto-rebuild operation without intervention from the host device; and
  sending, by the at least one SSD, an auto-rebuild complete command to the host device after performing the auto-rebuild operation.

7. The method of claim 6, wherein each of the plurality of SSDs is configured to receive the auto-rebuild command along with the information of the spare SSD from the host device in response to failure of the at least one SSD.

8. The method of claim 6, wherein the at least one SSD reads the stripe data from the address mapping table of the spare SSD via peer-to-peer communication with other SSDs of the plurality of SSDs, wherein the spare SSD receives the stripe data from the host device via a Controller memory buffer (CMB).

9. The method of claim 8, wherein the CMB is associated with the spare SSD.

10. The method of claim 6, wherein the stripe data indicates addresses of consecutive segments of logically sequential data stored at respective ones of the plurality of SSDs.

11. A method of controlling operations of a Redundant Array of Independent Disks (RAID) data storage system, the RAID data storage system including a host device and a plurality of solid-state drives (SSDs), the method comprising:
  enabling, by the host device, a snapshot feature for at least one SSD of the plurality of SSDs to manage snapshot data of an address mapping table;
  sending, by the host device, a snapshot version and a timestamp to the at least one SSD to retrieve the snapshot data of the address mapping table; and
  receiving, by the host device, the snapshot data from the at least one SSD based on the snapshot version and the timestamp.

12. The method of claim 11, wherein the address mapping table includes the snapshot data of the at least one SSD, the timestamp, and the snapshot version.

13. The method of claim 11, further comprising:
  determining, by the at least one SSD, a number of free blocks and a snapshot frequency such that the number of free blocks and the snapshot frequency satisfy a garbage collection (GC) criteria; and
  initiating, by the at least one SSD, a GC operation in response to determining that the GC criteria is not satisfied.

* * * * *